(12) United States Patent
Miyazaki

(10) Patent No.: US 10,416,374 B2
(45) Date of Patent: Sep. 17, 2019

(54) LIQUID CRYSTAL DISPLAY DEVICE

(71) Applicant: Japan Display Inc., Minato-ku (JP)

(72) Inventor: Hiroyuki Miyazaki, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/834,105

(22) Filed: Dec. 7, 2017

(65) Prior Publication Data

US 2018/0210143 A1    Jul. 26, 2018

(30) Foreign Application Priority Data

Jan. 20, 2017 (JP) ................................ 2017-008529

(51) Int. Cl.
    *F21V 8/00* (2006.01)
    *G02F 1/1335* (2006.01)

(52) U.S. Cl.
    CPC ........... *G02B 6/0088* (2013.01); *G02B 6/009* (2013.01); *G02B 6/0011* (2013.01); *G02B 6/0091* (2013.01); *G02F 1/133615* (2013.01); *G02B 6/0093* (2013.01)

(58) Field of Classification Search
    CPC ............ G02F 1/133615; G02B 6/0088; G02B 6/0011
    See application file for complete search history.

(56) References Cited

U.S. PATENT DOCUMENTS

| | | | | |
|---|---|---|---|---|
| 2012/0086883 A1* | 4/2012 | Wakita | ................... | G02B 6/002 349/61 |
| 2013/0155721 A1* | 6/2013 | Miyazaki | .......... | G02F 1/133615 362/611 |
| 2014/0267971 A1* | 9/2014 | Sugimoto | ......... | G02F 1/133308 349/58 |
| 2015/0277179 A1* | 10/2015 | Nishi | ................... | G02B 6/0088 349/58 |
| 2017/0343721 A1* | 11/2017 | Takada | ................. | G02B 6/0013 |
| 2018/0113252 A1* | 4/2018 | Lee | ....................... | G02B 6/0088 |

FOREIGN PATENT DOCUMENTS

| | | |
|---|---|---|
| JP | 2010-113982 | 5/2010 |
| JP | 2014-174540 | 9/2014 |

* cited by examiner

*Primary Examiner* — Alexander P Gross
(74) *Attorney, Agent, or Firm* — Oblon, McClelland, Maier & Neustadt, L.L.P.

(57) ABSTRACT

The purpose of invention is to suppress rattling in a backlight for the automotive display. The invention is: the backlight has a light guide, a container, and a light source; the light guide has a first side surface, where the light source opposes, a second side surface opposing to the first side surface, a third side surface and a fourth side surface extending in a second direction, the container has a third inner wall opposing to the third side surface and a fourth side surface opposing to the fourth side surface, a projection is formed at the third side surface or the fourth surface, the projection is inserted in a recess formed in the third inner wall or in the fourth inner wall, the recess has an eave, under which the projection is inserted; thus, movement of the light guide in up and down is suppressed.

16 Claims, 11 Drawing Sheets

D–D

LIQUID CRYSTAL DISPLAY DEVICE

CLAIM OF PRIORITY

The present application claims priority from Japanese Patent Application JP 2017-008529 filed on Jan. 20, 2017, the content of which is hereby incorporated by reference into this application.

BACKGROUND OF THE INVENTION (1) Field of the Invention

The present invention relates to a liquid crystal display device, specifically a backlight for the automotive display.

(2) Description of the Related Art

A liquid crystal display device comprises a TFT substrate where pixels are arranged in a matrix form, each of the pixels has a pixel electrode and a thin film transistor (TFT); a counter substrate set opposing to the TFT substrate; a liquid crystal layer sandwiched by the TFT substrate and the counter substrate. Images are formed by controlling a transmittance of light by liquid crystal molecules in each of the pixels. Since liquid crystal display devices are flat and light, their applications are expanding.

Since the liquid crystal is not self-illuminant, the liquid crystal display device needs a backlight. The so called side light type backlight, in which the light source is set at the side of the light guide, is used to make the back light thin. Therefore, the light guide is a main component in the back light; thus, the issue is how to accommodate the light guide in the back light.

The patent document 1 (Japanese patent laid open 2010-113982) discloses to directly fit the projection of the light guide to the metal frame without using a resin mold to decrease the manufacturing cost of the backlight. The patent document 2 (Japanese patent laid open 2014-174540) discloses to fit the projection of the light guide to the recess formed in the resin mold; and cover the fitting portion by the light shielding components to prevent a leak of light from the fitting portion.

SUMMARY OF THE INVENTION

In the automotive liquid crystal display device, vibrations to the liquid crystal display device are the problem; specifically fixing of the light guide, which is a major component of the backlight, is important. If the light guide is not firmly fixed, a rattling noise occurs by vibrations.

Another requirement for the automotive display is that it must endure the temperature range of −40 centigrade to 100 centigrade. The light guide is formed by resin, which has a big difference from the metals in thermal expansion coefficient. Therefore, the light guide will warp or deformed permanently if a countermeasure to the thermal expansion is not taken. If the light guide warps, color unevenness or brightness unevenness occurs.

The purpose of the present invention is to realize the liquid crystal display device that maintain high reliability even when it is exposed to a wide range temperature change or vibrations applied to the backlight.

The present invention solves the above problem; the concrete measures are as follows:

(1) A display device including a liquid crystal display panel and a backlight comprising: the backlight has a light guide, a container to accommodate the light guide, and a light source; the light guide has a first side surface, extending in a first direction, and in which light from the light source enters, a second side surface opposing to the first side surface, a third side surface extending in a second direction that crosses the first direction, and a fourth side surface that opposes the third side surface; the container has a third inner wall opposing to the third side surface and a fourth side surface opposing to the fourth side surface, a projection is formed at the third side surface or the fourth surface, the projection is inserted in a recess formed in the third inner wall or in the fourth inner wall, the recess formed in the third inner wall or in the fourth inner wall has an opening, the opening has a first portion that has a first width in the second direction, and a second portion that has a second width in the second direction, the second width is bigger than the first width.

(2) The display device according to (1), wherein the container has a second inner wall opposing to the second side wall, an elastic body is inserted between the second inner wall of the container and the second side surface of the light guide.

DETAILED DESCRIPTION OF THE PREFERRED EMBODIMENTS

The invention is described in detail by the following embodiment.

First Embodiment

Figure 1:
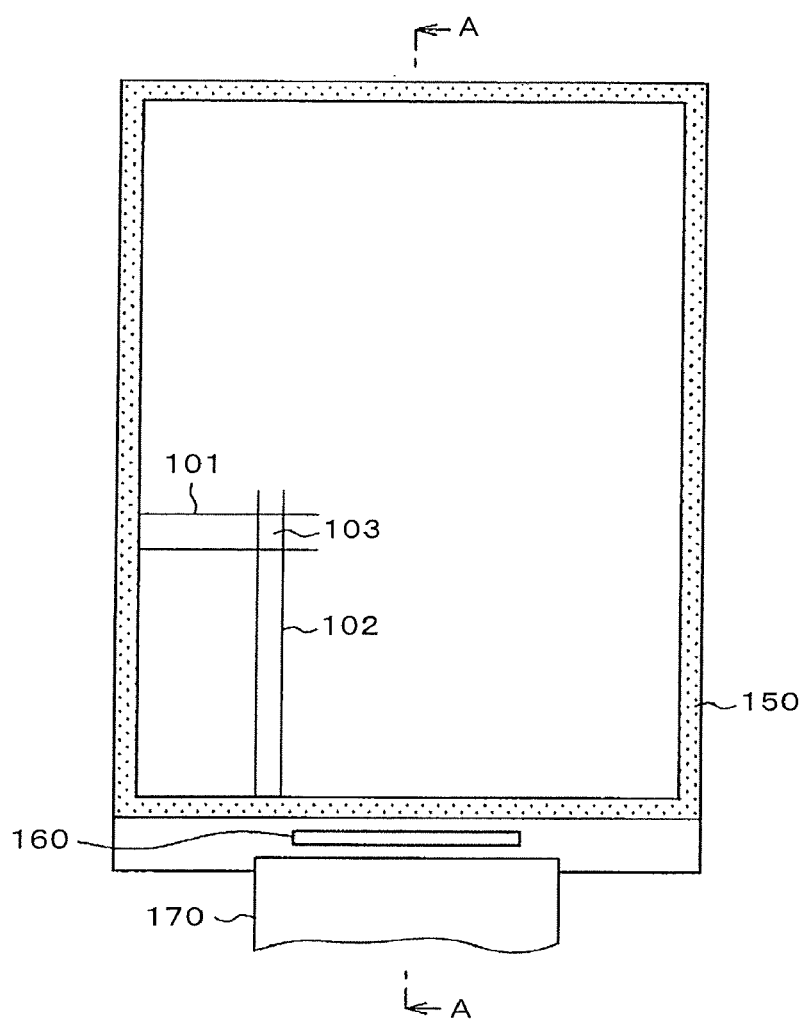
FIG. 1 is a plan view of the liquid crystal display device that the present invention is applied.
Figure 2:
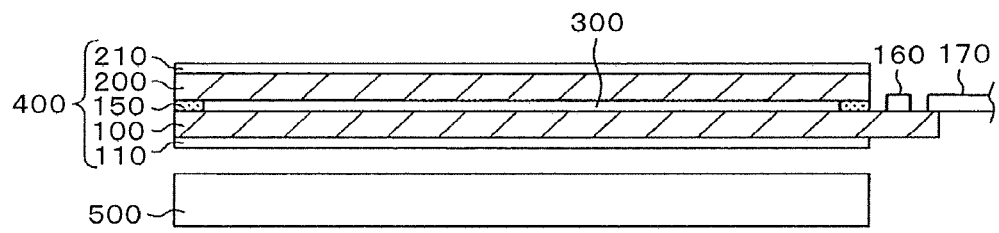
FIG. 2 is cross sectional view along the line A-A of FIG. 1.

FIG. 1 is a plan view of a liquid crystal display device according to the present invention; FIG. 2 is cross sectional view along the line A-A of FIG. 1. In FIGS. 1 and 2, the TFT substrate 100 and the counter substrate 200 adhere to each other via the sealing material 150; the liquid crystal 300 is sealed inside of the sealing material. The display area is formed where the TFT substrate 100 and the counter substrate 200 overlap to each other. The diagonal size of the display area is e.g. 13 inches. In the display area, the scanning lines 101 extend in lateral direction and arranged in longitudinal direction; the video signal lines extend in longitudinal direction and arranged in lateral direction. The pixel 13 is formed in the area surrounded by the scanning lines 11 and the video signal lines 12.

The TFT substrate 100 is made bigger than the counter substrate 200; the portion where the TFT substrate 100 and the counter substrate 200 don't overlap is the terminal area 150. The driver IC 160 that drives the liquid crystal display device is installed in the terminal area; the flexible wiring substrate 170 is connected to the terminal area to supply powers and signals to the liquid crystal display device. Since the liquid crystal is not self-illuminant, the back light 500 is set behind the liquid crystal display panel 400.

In FIG. 2, the TFT substrate 100 and the counter substrate 200 adhere to each other by the sealing material 150. Since the liquid crystal 300 controls only polarized light, the lower polarizing plate 110 is adhered underneath the TFT substrate 100 and the upper polarizing plate 210 is attached on the counter substrate 200. The TFT substrate 100, the counter substrate 200, the lower polarizing plate 110 and the upper polarizing plate 210 constitute the liquid crystal panel 400.

The back light 500 is set behind the liquid crystal display panel 400. The liquid crystal panel 400 and the back light 500 constitute the liquid crystal display device. There are a down light type backlight and a side light type back light in the backlight 500 according to the position of the light source. If a thin liquid crystal display device is required the side light type back light is adopted.

Figure 3:
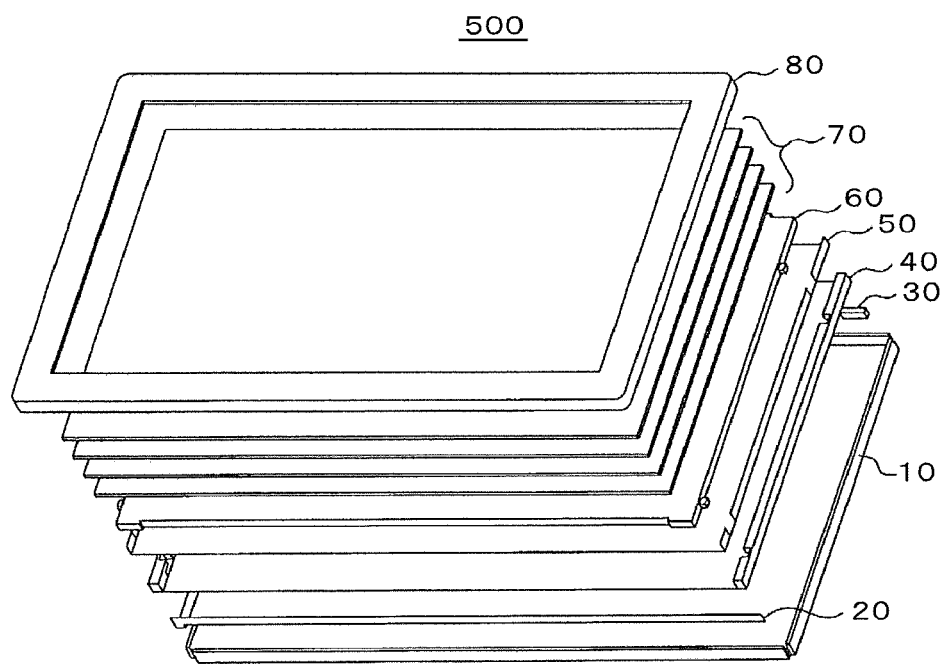
FIG. 3 is an exploded perspective view of the backlight.

FIG. 3 is an exploded perspective view of the backlight. The backlight is installed inside of the lower frame 10 and the bezel 80. In FIG. 3, The LED unit 20 is adhered to the inner wall of the long side of the lower frame 10. The resin frame 40 is set above the lower frame 10; the reflecting sheet 50 is set on the resin frame 40; and the light guide 60 is set on the reflecting sheet 50. The reflecting sheet 50 is sandwiched and held between the light guide 60 and the lower frame 10.

The group of the optical sheets 70 is set on the light guide 60. In FIG. 3, the group of the optical sheets 70 is formed by four sheets of e.g. the lower diffusion sheet, the lower prism sheet, the upper prism sheet and the upper diffusion sheet. The bezel 80 covers the periphery of the group of the optical sheets 70 and a side surface of the lower frame 10.

One feature of the present invention is the structure as that: to form the locking projections 61 at the side surface of the light guide 60; to insert the locking projections 61 into the L shaped recesses 41 of the resin frame 40; thus, to suppress the movement of the light guide 60 and to suppress the warping of the light guide 60 due to a thermal expansion of the light guide 60. By the way, L shaped recess 41 may be called the locking recess 41 in this specification.

Figure 4:
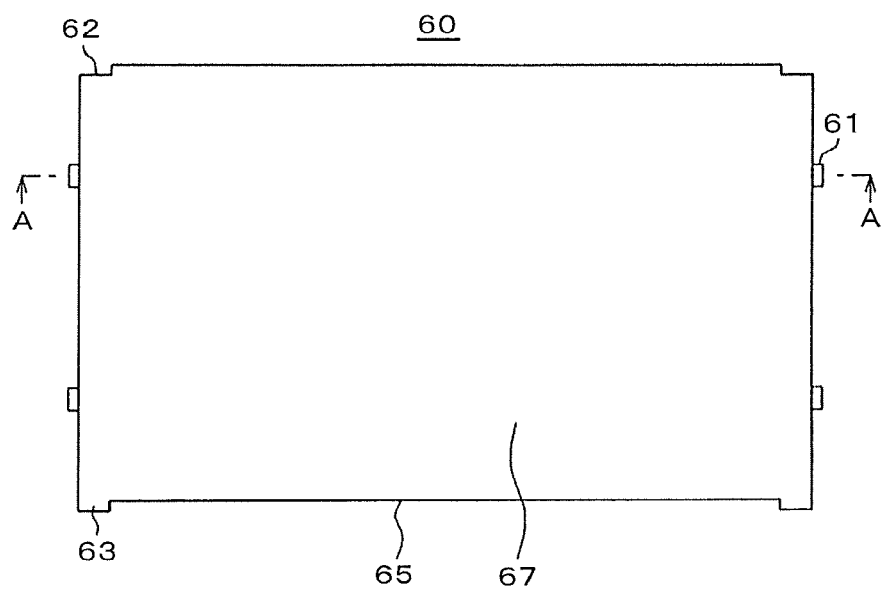
FIG. 4 is a plan view of the light guide according to the present invention.

FIG. 4 is a plan view of the light guide 60. The light guide 60 has an incident surface 65, which opposes the light source of LED; the light from the LED enters in the light guide 60 from the incident surface 65, and exits from the exit surface 67 of the light guide 60. The exit surface 67 may be called a major surface 67 in the specification. The light guide 60 has four side surfaces that surround the major surface 67; the light guide 60 is approximately rectangle when viewed from the exit surface 67; two locking projections 61 are formed on each of the short sides of the light guide 60. The locking projections 61 are inserted in the L shaped recesses 41 formed in the resin frame 40. On the other hand, two corner recesses 62 are formed in one of two long sides of the light guide 60 to mate with the rubber bush 30 for fixing the light guide 60. At the long side of the light guide 60, where the LEDs oppose, LED projections 63 are formed at edges of the long side to precisely determine the distance between the LEDs and the side surface of the light guide 60. By the way, the plan view of the light guide 60 is not necessarily a rectangle; it can be a variant shape as e.g. a trapezoidal. Thus, there is a chance that the locking projections 61 are formed on the sides which are not parallel to each other.

Figure 5:
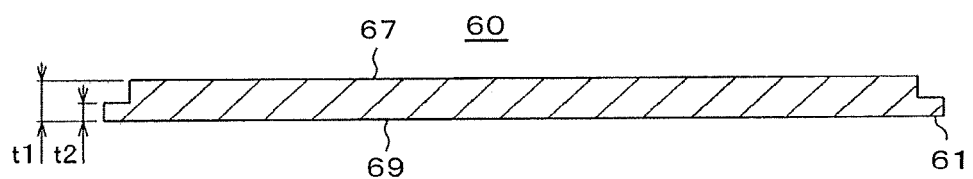
FIG. 5 is cross sectional view along the line A-A of FIG. 4.
Figure 8:
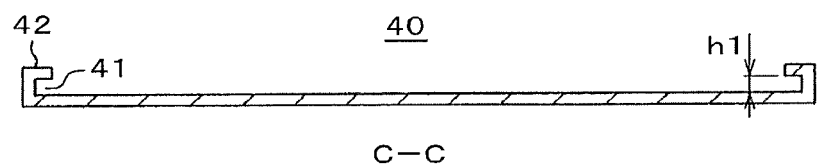
FIG. 8 is cross sectional view along the line C-C of FIG. 6.

FIG. 5 is cross sectional view along the A-A line of FIG. 4. The light guide 60 has the exit surface 67 and the base surface 69, which opposes to the exit surface 67. In FIG. 5, locking projections 61 are formed on the both side surfaces. The thickness t2 of the locking projection 61 is ½ to ⅓ of the thickness t1 of the light guide 60. The reason why t2 is smaller than t1 is that: to insert the locking projection 61 into the L shaped recess 41 and further to insert the locking projection 61 in the hollow under the eave 42 as depicted in FIG. 8.

Figure 6:
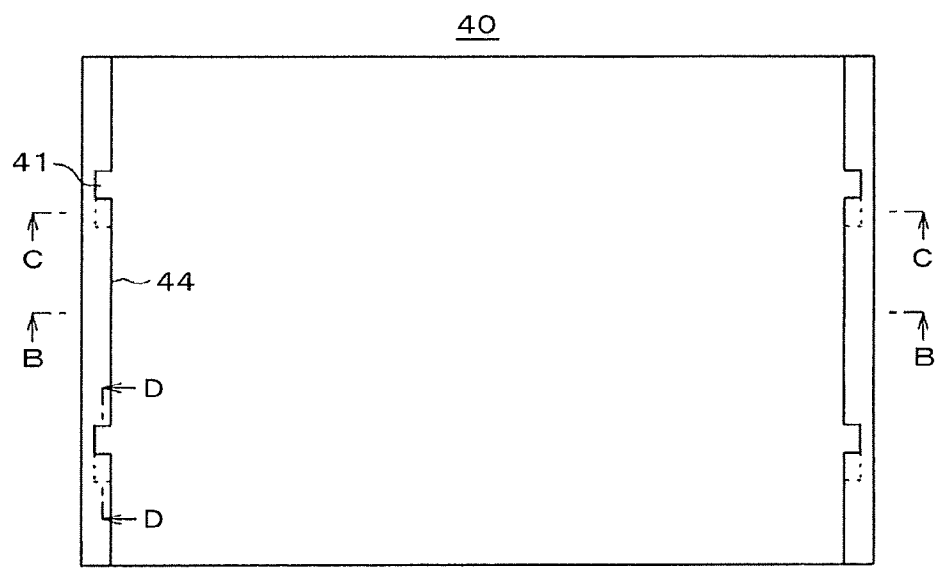
FIG. 6 is a plan view of the resin frame.

FIG. 6 is a plan view of the resin frame 40 that accommodates the light guide 40. The resin frame 40 is a very thin plate as a whole, however, only the short sides are thick to form walls 44 to oppose to the short sides of the light guide 60. Further, L shaped recesses 41 are formed at the short sides of the resin frame 40 to receive the locking projections 61 of the light guide 60.

Figure 7:
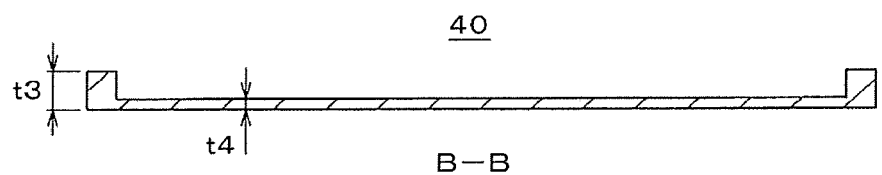
FIG. 7 is cross sectional view along the line B-B of FIG. 6.

FIG. 7 is cross sectional view along the line B-B of FIG. 6. In FIG. 7, the thickness t3 at the sides of the resin frame 40 is e.g. 3.5 mm while the thickness t4 of the sheet like portion, which occupies most area of the resin frame 40, is e.g. 0.2 mm. FIG. 8 is cross sectional view along the line C-C of FIG. 6, corresponding to the cross section where the L shaped recesses 41 are formed. In FIG. 8, the L shaped recess 41 is formed at the wall of the side of the resin frame 40 to mate with the locking projection 61 of the light guide 60. The eave 42 is formed at the L shaped recess 41 to fix the light guide 60 so that the light guide doesn't move in upper and lower directions. The gap h1 between the eave 42 and the base of the resin frame 40 is a space that the locking projection 61 of the light guide 60 is inserted, and the eave 42 prevents the movement of the light guide 60 in upper and lower directions.

Figure 9:
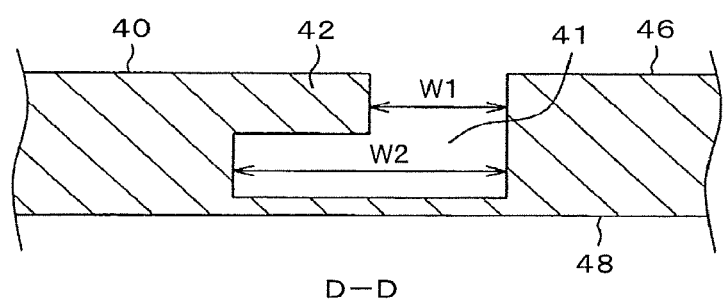
FIG. 9 is cross sectional view along the line D-D of FIG. 6.

FIG. 9 is a cross sectional view along the line D-D of FIG. 6 that shows a cross section of the L shaped recess 41. In FIG. 9, the cross section of the recess is L shaped. In FIG. 9, the locking projection 61 is inserted in the opening portion formed at the top edge 46 of the L shaped recess 41. The width W1 of the opening portion at the top edge 46 of the L shaped recess 41 is slightly bigger than the width of the locking projection 61. Then, the locking projection 61 is pushed down to the bottom side 48 where the width of the opening is W2. The width W2 is substantially wider than the width W1 and the width of the locking projection 61; thus, the locking projection 61 can move to left direction in FIG. 9. The locking projection 61 is pushed toward the left wall in FIG. 9 and fixed under the eave 42 to suppress the up and down movement of the light guide 60.

Figure 10:
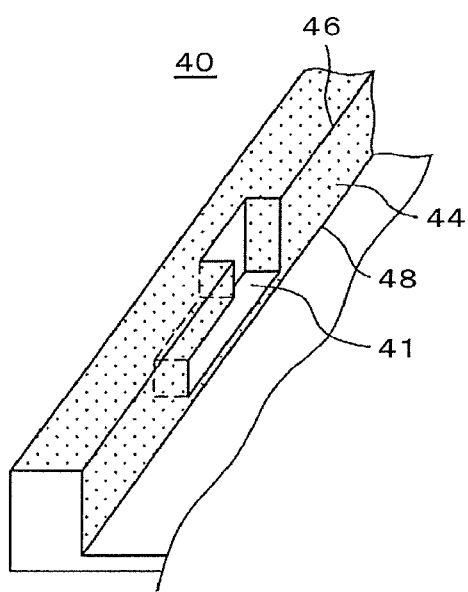
FIG. 10 is the perspective view of the resin frame 40 at the portion where the L shaped recess exists.

FIG. 10 is the perspective view of the resin frame 40 at the place where the L shaped recess 41 exists. By the way, although the reflection sheet is not described in FIG. 10, actually the reflection sheet 50 is set against the inner wall of the resin frame 40 avoiding the L shaped recess 41

Figure 11:
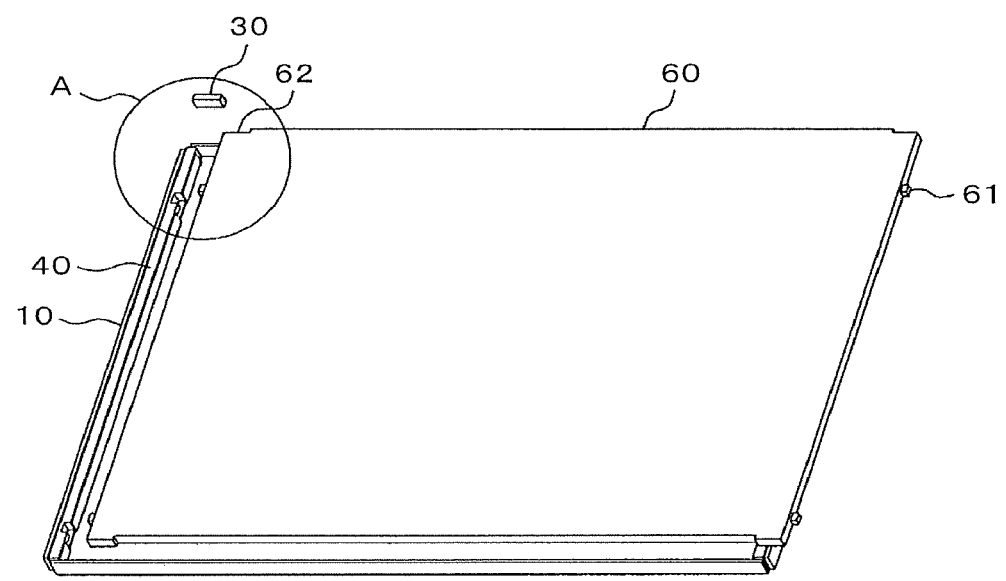
FIG. 11 is a perspective view of the lower frame, the resin frame, the light guide and the rubber bush to be assembled.

As described in FIG. 10, the L shaped recess 41 is formed in the inner wall 44 of the resin frame 40. As described in FIG. 9, the widths of the openings of the L shaped recesses are as follows: the top width W1 at the top of the L shaped recess 41 is slightly bigger than the width of the locking projection 61; bottom width W2 at the bottom of the L shaped recess 41 is bigger than the width W1, FIG. 11 is a perspective view that the lower frame 10, the resin frame 40, the light guide 60 and the rubber bush 30 are about to be assembled. In FIG. 11, the light guide 60 is set as the manner that the locking projections are as to mate with the L shaped recesses 41 of the resin frame 40; and the rubber bush 30 is set corresponding to the corner recess 62 of the light guide 40. In FIG. 11, the resin frame 40 is set inside of the lower frame 10. By the way, the term of rubber bush is used in this specification; however, the material for the bush doesn't need to be restricted to rubber as far as the material has a necessary elasticity.

Figure 12:
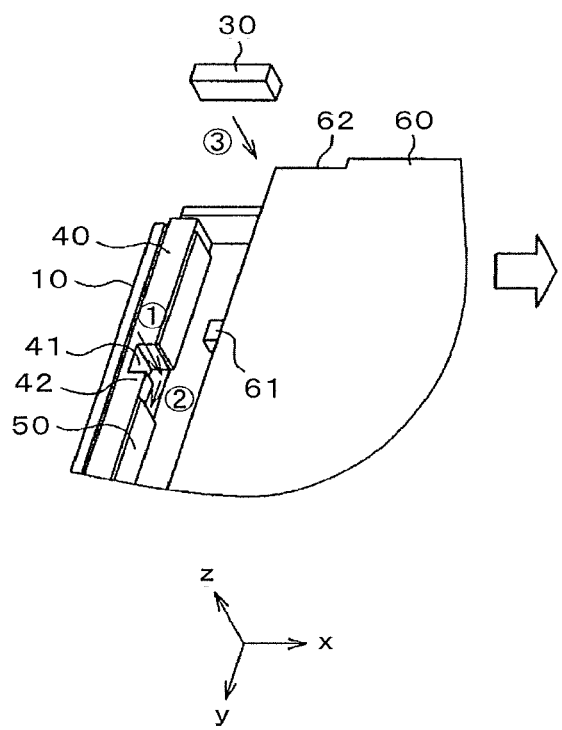
FIG. 12 is an enlarged view of the portion A in FIG. 11.

FIG. 12 is an enlarged view of the portion A in FIG. 11. In FIG. 12, the resin frame 40 is set inside of the lower frame 10. Since the wall portion of the lower frame 10 is formed by cutting and raising the lower frame is not formed at the corner in FIG. 12. In FIG. 12, the L shaped recess 41 is formed in the resin frame 40 to receive the locking projection 61. In FIG. 12, the reflecting sheet 50 is set along the inner wall of the resin frame 40; however, the reflecting sheet 50 may be omitted in other figures.

In FIG. 12, the arrow (1) indicates that the locking projection 61 of the light guide 60 is inserted in the L shaped recess 41 of the resin frame 40. Afterwards, the locking projection 61 of the light guide 60 moves in direction y in the L shaped recess 41 as depicted by the arrow (2). After the light guide 60 has moved to the direction of the arrow (2), the locking projection 61 exists in a space under the eave 42 at the L shaped recess 41, thus, the movement in z direction of the light guide 60 is suppressed.

After that, the rubber bush 30 is inserted in the direction of the arrow (3) between the lower frame 10 and the corner recess 62 of the light guide 60, thus, movement of the light guide 60 in x direction and y direction is suppressed. As far as the movements in x and y direction are suppressed, the movement of the locking projections 61 of the light guide 60 in z direction is suppressed by the eaves at the L shaped recesses 41 of the resin frame 40; therefore, the light guide 60 is fixed in stable in the resin frame 40 and the lower frame 10.

Figure 13:
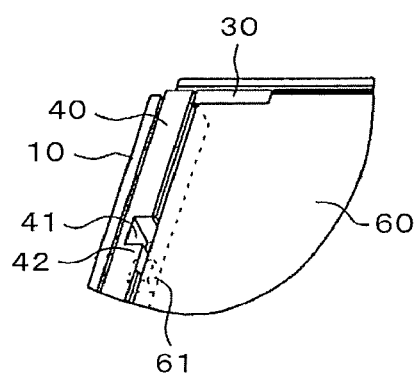
FIG. 13 is a perspective view that the lower frame, the resin frame, the light guide and the rubber bush are assembled

FIG. 13 shows that the locking projection 61 is inserted in the L shaped recess 41, then, moved to y direction; consequently, the locking projection 61 exists under the eave 42 at the L shaped recess 41. FIG. 13 further shows that the rubber bush 30 is inserted between the lower frame 10 and the corner recess 62 of the light guide 60. Thus, movement of the light guide 60 is suppressed.

Figure 14:
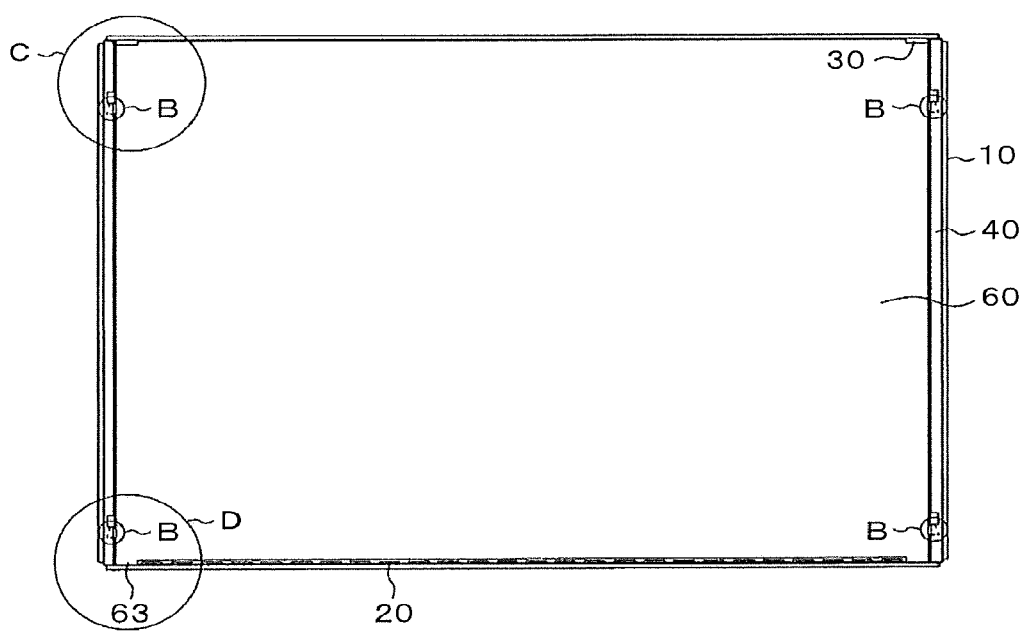
FIG. 14 is a plan view that the lower frame, the resin frame and the light guide have been assembled.

FIG. 14 is a plan view that the lower frame 10, the resin frame 40 and the light guide 60 are assembled. In FIG. 14, notation B is the area where the locking projection 61 of the light guide 60 and L shaped recess 41 of the resin frame 40 are mated together. In FIG. 14, the rubber bush 30 is inserted between the corner recess 62 of the light guide 60 and the lower frame 10 to push the light guide 60 against the wall of the long side of the lower frame 10; thus, movement of the light guide 60 is suppressed.

Figure 15:
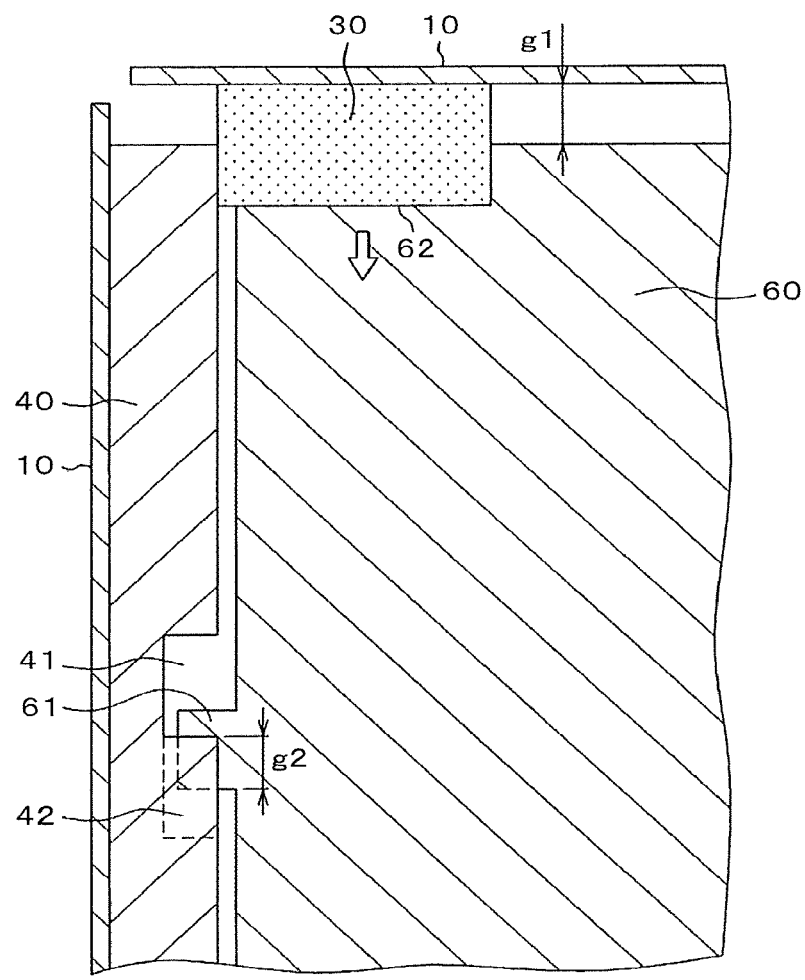
FIG. 15 is an enlarged plan view which corresponds to the area C of FIG. 14.

FIG. 15 is an enlarged plan view to show this state, which corresponds to the area C of FIG. 14. In FIG. 15, the resin frame 40 is inside of the lower frame 10. The reflection sheet is omitted in FIG. 15. The locking projection 61 of the light guide 60 is inserted under the eave 42 at the L shaped recess 41 of the resin frame 40. The resin frame 40 is pushed in the direction of arrow 62 by the rubber bush 30 inserted in the corner recess 62 of the light guide 60. Thus, an amount of overlap between the eave 42 at the L shaped recess 41 and the locking projection 61 of the light guide 60 is maintained in stable.

The amount of overlap between the eave 42 and the locking projection 61 is g2. On the other hand, the space between the lower frame 10 and the side wall of the light guide 60 is g1 at the side where the rubber bush 30 exists. It is better to take g1 bigger than g2 for assembly tolerance. By the way, the light guide 60 is pushed in the direction of arrow 62; consequently, the LED projection 63, formed at the opposing long side of the light guide 60, is pressed against the wall of the lower frame 10.

Figure 16:
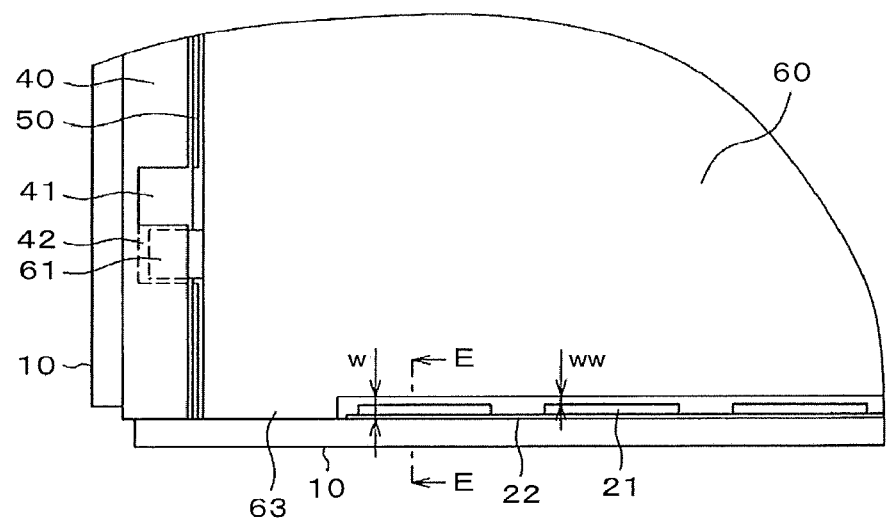
FIG. 16 is an enlarged view of the area D of FIG. 14.

Back to FIG. 14, the LED projections 63 are formed at the edges of the long side of the light guide 60 opposing to the side wall where the LED unit 20 is set. Thus, a certain space is formed between the inner wall of the lower frame 10 and the side wall of the light guide 60. FIG. 16 is an enlarged view of the area D of FIG. 14. In FIG. 16, the locking projection 61 is inserted in the L shaped recess 41 and exists under the eave 42 as explained at FIG. 15.

In FIG. 16, the LED projection 63 of the light guide 60 is pushed against the inner wall of the lower frame 10; thus, a certain space w is formed between the side wall of the light guide 60 and the inner wall of the lower frame 10. The space ww between the LED 21 and the side wall of the light guide 60 has a great influence for the utilization efficiency of the light from the LED 21. Thus, the brightness of the screen is greatly affected by this space between the LED 21 and the side wall of the light guide 60. In addition, since the difference in brightness due to the fluctuation of the distance ww reveals brightness unevenness in the screen, which is easily noticeable. Further, if the brightness unevenness is different among the colors, it causes the color unevenness.

In the present invention, the distance w between the side wall of the light guide 60 and the inner wall of the lower frame 10 is determined by accuracy of the LED projections 63, which can be precisely formed; thus, the distance w is determined very accurately. On the other hand, the LED unit 20 is also accurately set because it is only adhered to the inner wall of the lower frame 10.

Figure 17:
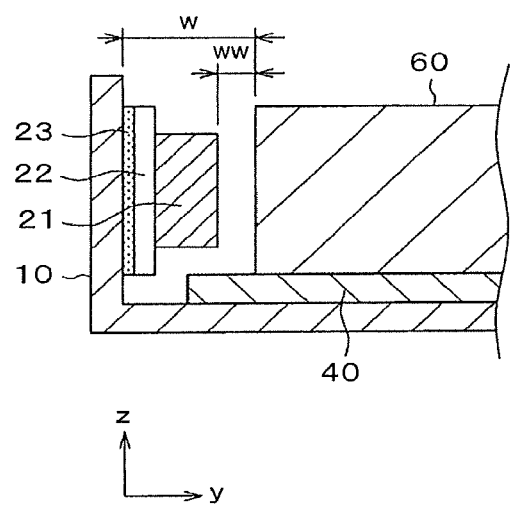
FIG. 17 is cross sectional view along the line E-E of FIG. 16.

FIG. 17 is cross sectional view along the line E-E of FIG. 16. In FIG. 17, the light guide 60 is set on the resin frame 40; the LED unit 20 is adhered to the inner wall of the lower frame 10 by the adhesive 23. The LED unit 20 is constituted by the LED wiring substrate 22 and LED module 21 including LED chip (herein after simply LED 21). Both of the LED 21 and the LED wiring substrate 22 can be accurately made in the direction of y in FIG. 17.

In FIG. 17, the distance w is accurately set since it is determined by manufacturing accuracy of the LED projection 63 of the light guide. Thus, the distance between the tip of the LED 21 and side wall of the light guide 60 can be determined accurately and uniformly without fluctuation in assembling process. By the way, ww is set e.g. between 0.1 mm to 0.13 mm. Therefore, images of less unevenness in brightness and less unevenness in color can be realized according to the present invention.

The light guide 60 explained above has two locking projections at the short sides. However, the number and the position of the locking projections 61 are not restricted in the above example, but can be set in various ways. The locking projections 61 of the light guide 60 of the present invention have not only a role to fix the position of the light guide 60 stably but also can have a role to suppress a warp of the light guide 60. The reason is as follows. The light guide 60 is formed by resin while the lower frame 10 is formed by metal.

There is a big difference in thermal expansions of the resin and the metal, thus, if the temperature rise, the expansion of the light guide 60 is bigger than the lower frame 10; consequently, the light guide 60 tends to warp upward with respect to the lower frame 10. This warping is biggest at the center of the light guide 60. Therefore, if the locking projection 61 is formed at the center of the short side of the light guide 60 and set the L shaped recess 41 of the resin frame 40 at the corresponding position, the warping of the light guide 60 can be suppressed.

Figure 18:
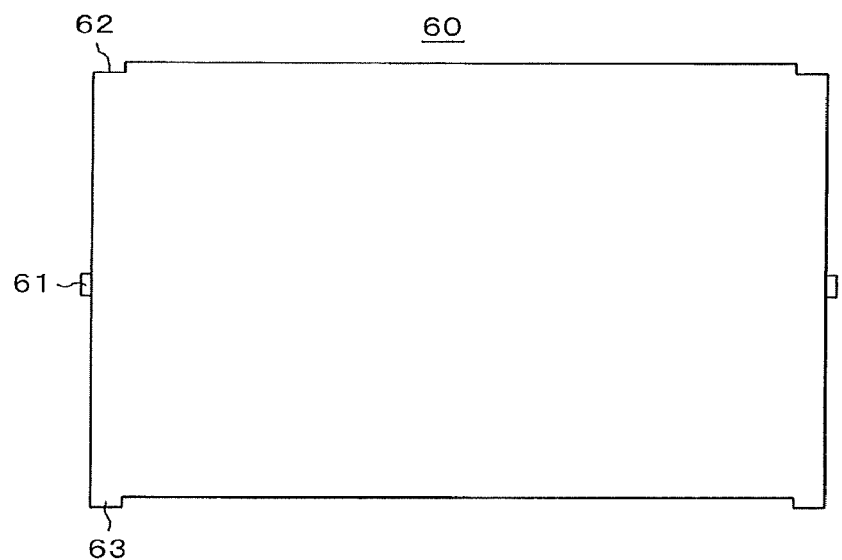
FIG. 18 is a plan view of the light guide according to a second example of the invention.

The light guide 60 shown in FIG. 18 is suitable for this purpose. In FIG. 18, the locking projection 61 is formed at the center of the short side of the light guide 60. According to the structure of FIG. 18, the warping is effectively suppressed at the center of the light guide 60 where the warping stress is largest; thus, brightness unevenness and color unevenness can be effectively suppressed. Further, since the structure of FIG. 18 has only one locking projection 61 at one side of the light guide 60, efficiency of assembling process is improved.

Figure 19:
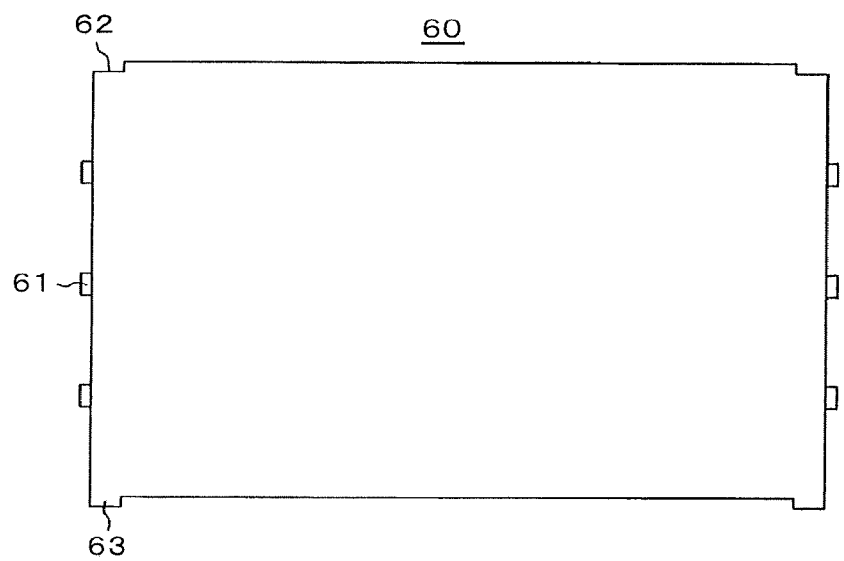
FIG. 19 is a plan view of the light guide according to a third example of the invention.

FIG. 19 is a plan view that shows yet another example of the light guide 60. In FIG. 19, three locking projections 61 are formed at one short side of the light guide 60 including at the center of the short side. Forming three locking projections in one short side enables a stable fixing of the light guide 60 and also can effectively suppress the warping of the light guide 60.

In the structure explained above, the light guide 60 is set in the resin frame 40 accommodated in the lower frame 10; however, the present invention is not restricted to this structure. The present invention can be applicable to the structure that the lower frame 10 and the resin frame 40 are unitized. For example, the resin frame 40 of FIG. 6 has walls only at short sides. On the contrary, if the walls of the resin frame 40 shown in FIG. 6 are formed on the long sides of the resin frame 40, the resin frame can also work as a lower frame.

Namely, the lower frame 10 can be eliminated if a first wall is formed on the long side of the resin frame 40 where the LED unit 20 is set and a second wall is set on the long side of the resin frame 40 where the rubber bush is inserted. In other words, as the same token, the lower frame 10 can also have a role of the resin frame in addition to the role as a lower frame; consequently it enables to eliminate the resin frame 40.

As described above, according to the present invention, the light guide 60 can be fixed stably, and warping of the light guide 60 is suppressed; thus, the liquid crystal display device having high quality display images, superior environmental durability and high reliability can be realized. Further, the adhesive or the pressure sensitive adhesive is not necessary to fix the light guide, thus, man-hours for the assembly can be decreased.

What is claimed is:

1. A display device including a liquid crystal display panel and a backlight comprising:
    the backlight has a light guide, a container to accommodate the light guide, and a light source,
    the light guide has a first side surface, extending in a first direction, and in which light from the light source enters, a second side surface opposing to the first side surface, a third side surface extending in a second direction that crosses the first direction, a fourth side surface that opposes the third side surface, a first corner recess between the second side surface and the third side surface, and a second corner recess between the second side surface and the fourth side surface,
    the container has a second inner wall opposing to the second side surface, a third inner wall opposing to the third side surface and a fourth inner wall opposing to the fourth side surface,
    a projection is formed at the third side surface or the fourth side surface, the projection is inserted in a recess formed in the third inner wall or in the fourth inner wall,
    the recess formed in the third inner wall or in the fourth inner wall has an opening,
    the opening has a first portion and a second portion,
    the first portion has a first width in the second direction and a first height in a third direction that crosses the first and second directions,
    the second portion has a second width in the second direction and a second height in the third direction,
    wherein the second width is bigger than the first width,
    the first height is higher than the second height,
    the light guide is movable in the third direction more than the second height when the projection is in the first portion, and
    the light guide is restricted to move in the third direction less than the second height when the projection is in the second portion,
    a first elastic body is inserted in the first corner recess and contacts the second inner wall and the third inner wall,
    a second elastic body is inserted in the second corner recess and contacts the second inner wall and the fourth inner wall, and
    the first and second elastic body suppress a movement of the light guide in the first and second direction.

2. The display device according to claim 1,
    wherein the projection of the light guide exists in the second portion of the opening.

3. The display device according to claim 1,
    wherein the a thickness of the projection in the third direction is less than a height of the second portion of the opening in the third direction.

4. The display device according to claim 1,
    wherein the elastic body is a rubber bush.

5. The display device according to claim 1,
    wherein the light guide further comprising:
    the light guide has a major surface where light, which entered in the light guide from the light source, exits, and a bottom surface opposing to the major surface,
    the third inner wall or the fourth inner wall has a top edge at the side of the major surface and a bottom edge at the side of the bottom surface of the light guide,
    the first portion is formed in the third direction that is from the top edge to the bottom edge of the third wall or the fourth wall,
    the first portion connects with the second portion.

6. The display device according to claim 5,
    wherein
    an eave is formed above the second portion of the opening at the third inner wall or the fourth inner wall,
    a first space g1 in the second direction exists between the second side surface of the light guide and the second inner wall of the container,
    an overlapping amount in the second direction between the projection of the light guide and the eave at the recess of the container is g2,
    wherein g1>g2.

7. The display device according to claim 1,
wherein the container comprising, a first container and a second container that accommodate the first container,
the recess is formed in the first container, the light source is attached to the second container.

8. The display device according to claim 7,
the first container is made by resin.

9. The display device according to claim 7,
the second container is made by metal.

10. The display device according to claim 1,
wherein the container has a first inner wall opposing to the first side surface of the light guide,
the first side surface of the light guide has a first edge and a second edge,
a first projection is formed at the first edge, and a second projection is formed at the second edge,
the first projection and the second projection contact with the first inner wall.

11. The display device according to claim 10,
a second space is formed between the first inner wall of the container and the first side surface of the light guide,
the light source is adhered to the first inner wall of the container.

12. The display device according to claim 11,
wherein the light source is an LED.

13. The display device according to claim 11,
wherein a distance between the light source and the first side surface of the light guide is determined by the first projection and the second projection.

14. A display device including a liquid crystal display panel and a backlight comprising:
the backlight has a light guide and a container to accommodate the light guide,
the container comprising a bottom, a first inner wall, where a light source is set, extending in a first direction, a second inner wall opposing to the first inner wall, a third inner wall extending in a second direction that crosses the first direction, and a fourth inner wall opposing to the third inner wall,
the light guide has a first side surface opposing to the first inner wall, a second side surface opposing to the second inner wall, a third side surface opposing to the third inner wall, a fourth side surface opposing to the fourth inner wall, a first corner recess between the second side surface and the third side surface, and a second corner recess between the second side surface and the fourth side surface,
a locking projection is formed at the third side surface and at the fourth side surface of the light guide, the locking projection is inserted in a locking recess formed in each of the third inner wall and the fourth inner wall of the container, and
the locking recess has a first opening having a first width, a second opening having a second width,
wherein
the first opening extends in a third direction that is from a top to the bottom of the container, and connects with the second opening,
the second opening extends in the second direction so that the locking projection can move from the first opening to the second opening,
the locking recess is L shaped,
the light guide is movable from the top to the bottom of the container when the locking projection is in the first opening,
the light guide is restricted to move in the third direction when the locking projection is in the second opening,
a first elastic body is inserted in the first corner recess and contacts the second inner wall and the third inner wall,
a second elastic body is inserted in the second corner recess and contacts the second inner wall and the fourth inner wall, and
the first and second elastic body suppress a movement of the light guide in the first and second direction.

15. The display device according to claim 14,
wherein the elastic body is a rubber bush.

16. The display device according to claim 14,
wherein an eave is formed over the second opening at the third inner wall or at the fourth inner wall,
a first space g1 is formed between the second side surface and the second inner wall, an overlapping amount in the second direction between the locking projection and the cave is g2,
wherein g1>g2.

* * * * *